United States Patent [19]

Hendriks et al.

[11] Patent Number: 5,319,925
[45] Date of Patent: Jun. 14, 1994

[54] INSTALLATION FOR GENERATING ELECTRICAL ENERGY

[75] Inventors: Rudolf Hendriks, Velp; Hendrik J. Ankersmit, Schiedam, both of Netherlands

[73] Assignees: A.S.A. B.V., Schiedam; A.S.A. Turboconsult B.V., Velp, both of Netherlands

[21] Appl. No.: 68,000

[22] Filed: May 27, 1993

Related U.S. Application Data

[63] Continuation of Ser. No. 826,857, Jan. 28, 1992, which is a continuation of Ser. No. 527,026, May 22, 1990, Pat. No. 5,083,425.

[30] Foreign Application Priority Data

May 28, 1989 [NL] Netherlands ............... 8901348

[51] Int. Cl.$^5$ .............................. F02C 6/00
[52] U.S. Cl. .................. 60/39.183; 60/39.511; 415/179; 429/17
[58] Field of Search .......... 60/39.183, 39.07, 39.52, 60/39.511; 415/179; 429/17, 19

[56] References Cited

U.S. PATENT DOCUMENTS

| | | | |
|---|---|---|---|
| 2,658,336 | 11/1953 | Traupel | 60/39.183 |
| 3,473,331 | 10/1969 | Fernandes . | |
| 4,333,992 | 6/1982 | Healy | 429/17 |
| 4,678,723 | 7/1987 | Wertheim | 429/17 |
| 4,683,177 | 7/1987 | Kinoshita et al. | 429/17 |
| 4,685,287 | 8/1987 | Takuma | 60/39.07 |
| 4,759,997 | 7/1988 | Ohyauchi et al. | 429/19 |
| 4,838,020 | 6/1989 | Fujitsuka | 60/39.07 |
| 4,922,709 | 5/1990 | Hendriks | 60/39.183 |
| 5,083,425 | 1/1992 | Hendriks et al. | 60/39.183 |

FOREIGN PATENT DOCUMENTS

| | | |
|---|---|---|
| 0318122 | 5/1989 | European Pat. Off. . |
| 3523487 | 1/1987 | Fed. Rep. of Germany . |
| 1549417 | 12/1968 | France . |

*Primary Examiner*—Richard A. Bertsch
*Assistant Examiner*—Howard R. Richman
*Attorney, Agent, or Firm*—Weintraub, DuRoss & Brady

[57] ABSTRACT

An installation is proposed for generating electrical energy in an open circuit for a gaseous fluid, comprising a compressor unit driven by a turbine receiving the compressed fluid after its passage through an exhaust gas heat exchanger, the installation further comprising a power generator driven by a gas turbine, the circuit also comprising a fuel cell receiving natural gas in its anode from an external source and receiving the gaseous fluid from the compressor unit as an oxidizing agent in its cathode, the electrical power originating from both the generator and the fuel cell forming the output of the installation.

14 Claims, 6 Drawing Sheets

INSTALLATION FOR GENERATING ELECTRICAL ENERGY

This is a continuation of application Ser. No. 07/826,857, filed Jan. 28, 1992, which is a continuation of application Ser. No. 07/527,026, filed May 22, 1990, now U.S. Pat. No. 5,083,425.

SUMMARY OF THE INVENTION

In industry there is a need for an installation for generating electrical energy with a high efficiency, with the environmental pollution being, in addition, a minimum. Hitherto there have been various machines such as motors with internal combustion and gas turbines with which an efficiency of approximately 35% can in fact be achieved, but for which the noxious discharge (in particular, the NO content in the exhaust gases) nevertheless still causes concern. The object of the invention is to provide a method and an installation which provides an appreciable improvement in relation to the two above-mentioned problems: efficiency and noxious discharge.

In this connection, the invention is based on a method, known per se in various embodiments, for generating electrical energy using a gaseous medium, for example air, which is passed in an open circuit first through at least one compressor unit and further through a gas turbine in order then to escape via flue gas heat exchanger. The improvement which is proposed according to the invention is distinguished in that the gaseous medium, which is in the compressed state, is passed through the flue gas heat exchanger to raise the temperature at least once in order to be passed subsequently through one or more turbine(s), coupled to the compressor unit, with the release of energy, the gas flow within the circuit being passed as oxidizing agent into a fuel cell and together with a fuel (reducing agent), delivering electrical energy in said cell prior to or following after the development of mechanical energy in the gas turbine.

This method involves the combination of the following improvements:

the compressor used is not fed (as hitherto usual) by exhaust gases of the gas turbine or by another combustion process but mainly by the compressed air itself which is used for that purpose after undergoing an additional temperature increase in the flue gas heat exchanger;

the gaseous medium, which emerges from the above-mentioned compressor with relatively low pressure and temperature, is now used as combustion gas (oxidizing agent) in the fuel cell, together with a reducing agent (for example natural gas);

the pressure of the gaseous medium (oxidizing agent) is low at the inlet of the fuel cell, as is the pressure of the reducing agent, which renders the system more flexible.

The invention makes an operation possible with which, in the first place, a higher electrical efficiency is achieved and in which the theoretical CARNOT cycle is better approximated than was hitherto achievable. Secondly, this thermal circuit (which is subject to the CARNOT limitation) incorporates an electrochemical system which does not have this limitation and with which efficiencies of at least 55-70% are considered possible, with manageable temperatures even in the order of 1,000° C. Added to this is the fact that in the proposed method, there is always a certain calorific value available in the so-called spent fuel (reducing agent) which can be utilized, for example in a combustor. Moreover, the gas-air mixture which enters the gas turbine after passing through the combustor is not environmentally unfriendly. To be specific, only very small amounts of noxious $NO_x$ discharge (50 gr/GJ) can occur in the flue gases. The catalytic conversion process in the fuel cell produces no noxious products, with the result that the proposed new method does virtually not pollute the environment. A further contribution to reducing the environmental pollution resides in the increase in efficiency from 35% net for a power station to approximately 55 to 70% of this new method. Compared with the prior art, approximately half the fuel is therefore needed to generate the same quantity of electrical energy. This results in a corresponding $CO_2$ reduction. The use of a fuel cell has the double function of delivering electrical energy and of producing hot gases.

The invention also relates to an installation for carrying out the method described above and therefore for generating electrical energy by means of a gas stream using a number of mechanical components, comprising a compressor unit coupled to at least one turbine and further comprising at least one gas turbine (power turbine) provided with an output shaft, followed by a flue gas heat exchanger. According to the invention said installation is distinguished by the inter-connection of the said components so as to produce an open circuit of the gas stream, the pressure of which is first increased in the compressor unit, then its temperature is also increased in the flue gas heat exchanger, after which the gas stream eventually via a burner chamber is subsequently passed to the compressor(s), and finally it flows with a slight overpressure in the direction of the gas turbine but in doing so, after first having been passed upstream or subsequently downstream of said gas turbine as an oxidizing agent through a fuel cell provided in the circuit.

The application of this cell may cause an additional increase in efficiency with the same air stream and a somewhat less fuel consumption in the burner chamber. This effect is due to the waste heat of the cell increasing the heat content of the burner chamber. When applying a high temperature fuel cell (in the order of 1000° C., such as with a solid oxide fuel cell SOFC) the burner chamber of the gas turbine might even become virtually superfluous. The direct current from the fuel cell may be directly used as direct current or after conversion can be used as alternating current. A third possibility consists in the supply of the direct current to the electrical generator of the gas turbine.

The installation just described comprises turbine components known per se, with the result that use can be made of components already developed industrially to assemble an installation which, as a consequence of the high efficiency, results in a reduction in the $CO_2$ pollution of the environment in the order of magnitude of one half with respect to known machines such as motors with internal combustion, boiler-stream turbine installations and conventional gas turbines. A reduction in the $NO_x$ emission can be obtained of more than 50%. In this connection, no account has yet been taken of the possibility of environmental depollution if used in heat and power installations (total-energy concept).

It is pointed out that two types of fuel cell are, in particular, suitable for use in the procedure and the installation according to the invention. The first type is the so-called MCFC (molten carbonate fuel cell) with a working temperature of approximately 650° C. The other type is the so-caled PAFC (phosphoric acid fuel cell) with a working temperature of approximately 200° C. The solid oxide fuel cell (SOFC) can also be used, working temperature approximately 1,000° C.

The position of the fuel cell in the open circuit is preferably situated between the compressor and the power turbine (PT). A position more downstream and even beyond the gas turbine is possible. This is shown in dotted lines in the annexed drawings. Also a position upstream of the compressor is conceivable and even still further forward in the circuit.

DISCUSSION OF THE PRIOR ART

Different types of fuel cells are described in the following papers:
1) H. A. Liebhafsky and E. J. Cairns "Fuel cells and fuel batteries", Wiley & Son, New York (1968), Chapter 12, pages 524–554
2) A. J. Appleby and F. R. Foulkes, "Fuel Cell Handbook", Van Nostrand Reinholt, New York (1989)
3) Supramanian Srinivasan, Journal of the Electrochemical Society, 136 (2), February 1989, pages 41C–48C.

It is further observed that the U.S. Pat. No. 4,678,723 issued to WERTHEIM relates to a phosphoric acid fuel cell PAFC in combination with an autothermal reformer for delivering a gaseous mixture to a turbine which is driving a compressor unit; the fuel cell is cooled by water droplets and injected water fog for increasing its output. There is no gas turbine with an exhaust gas heat exchanger for increasing the temperature of the compressed gaseous mixture.

BRIEF DESCRIPTION OF THE DRAWINGS AND TABLE

The FIGS. 1–6 show very diagrammatically some embodiments of the installation in which electrical energy is generated. The table gives an example for a medium size plant.

DESCRIPTION OF PREFERRED EMBODIMENTS

Figure 1:
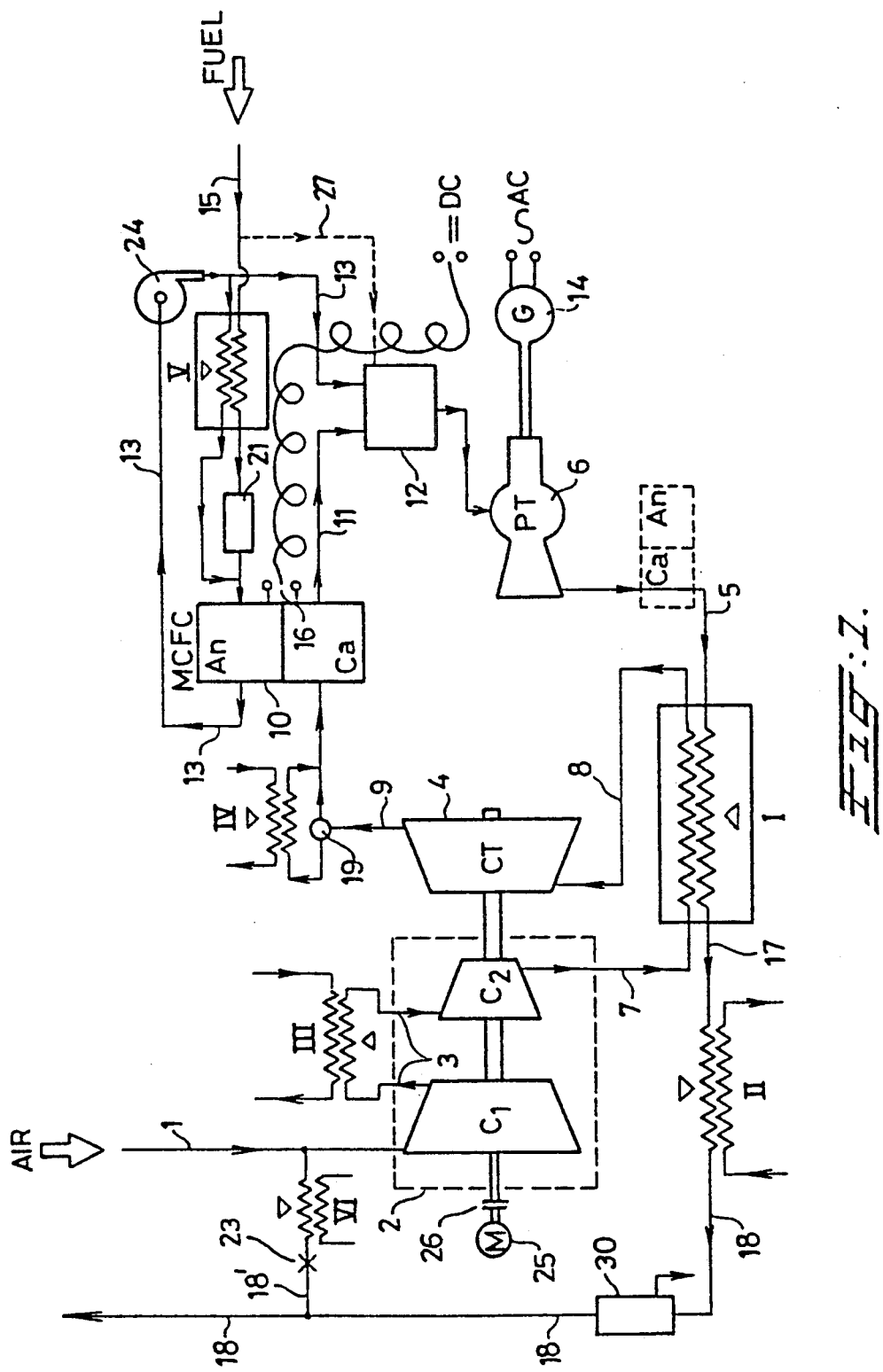

FIGS. 1–5 show a supply 1 of gaseous medium, for example air. Said medium passes) through an open circuit starting with a compressor unit 2, which in this case comprises a low-pressure compressor $C_1$ and a high-pressure compressor $C_2$ which are connected to each other by a line 3. This connecting line incorporates a heat exchanger III as the normal intercooler. The compressor unit 2 is driven by a turbine 4 which is constructed in this case as a single turbine CT for both compressors. It is also possible to drive each of the compressors $C_1$ and $C_2$ by an individual turbine.

Fitted in the open circuit is a flue gas heat exchanger I which is connected via a line 5 to a gas turbine 6 (the power turbine PT) for generating electrical energy. The high-pressure compressor $C_2$ is connected via a line 7 to the flue gas heat exchanger I and the gaseous medium heated therein flows, in the embodiment according to FIGS. 1, 2 and 4, via a line 8 to the turbine 4. After passing through this turbine, the gaseous medium, reduced in temperature, flows in the shown embodiment via a line 9 to a fuel cell 10 for the purpose of feeding the cathode of said cell with said medium, that is to say, with oxidizing agent. The medium, somewhat raised in temperature, then flows via a line 11 to a so-called combustor 12 which is also provided with a supply 13 of "spent fuel" as will be explained further below. The gas turbine 6 drives an electrical generator 14.

As an alternative solution, the drawings show in dotted lines the location of the fuel cell 10 downstream of the gas turbine 6. The connecting conduits should be adapted in a corresponding manner. The further description of the invention also applies to this variant. The specific advantages of this location of the fuel cell are the following:
 the pressure control is easier;
 it will be possible to eliminate the heat exchanger II.

In the chosen construction according to FIGS. 1–4, the fuel cell 10 is of the type MCFC (molten carbonate fuel cell). Said cell has an electrical efficiency of approximately 55% and the anode is provided with a supply 15 of fuel, that is to say, reducing agent such as a hydrogen-rich gas. It is pointed out, however, that, in the so-called internal reforming variant, a direct use of natural gas as fuel is also possible. As the final product in said fuel cell 10, direct current is produced at the terminals 16.

It is pointed out that three other heat exchangers II, IV and V are also depicted in the figures. The heat exchanger II is situated in the last section of the discharge line 17 of the flue gas heat exchanger I and utilizes in this manner a further portion of the heat present at the end 18 of the open circuit. The heat exchanger IV (FIG. 1) is switched on or off with the aid of a shut-off valve 19. In the one position of said shut-off valve, the gas stream is passed directly to the fuel cell 10 from the turbine 4 via the line 9. In the other position of the shut-off valve 19, said gas stream or a portion thereof is passed through the heat exchanger IV for the purpose of heating or cooling the gas stream. This may sometimes be required. The heat exchanger V serves to heat the fuel fed in via the line 15.

In case an FCMC-cell is applied, the feed of the cathode should contain air with a sufficient amount of $CO_2$. Under those circumstances a recycling of $CO_2$ within the system is the most obvious solution. This can take place by applying so-called selective separation techniques, for instance by incorporating membranes 30 in the lines 5, 17 or 18. A recycling of steam in line 18, eventually after separation of water after the heat-exchanger II in order to increase the proportion of inert gas. In the FIGS. 1–4 a branch conduit 18' is shown, comprising a control valve 23 and a heat exchanger VI as a schematic representation of this recycling process. With different types of fuel, such an additional conduit is not used, vide FIGS. 5 and 6. A centrifugal compressor 24 is applied for nebulizing the fuel.

Figure 2:
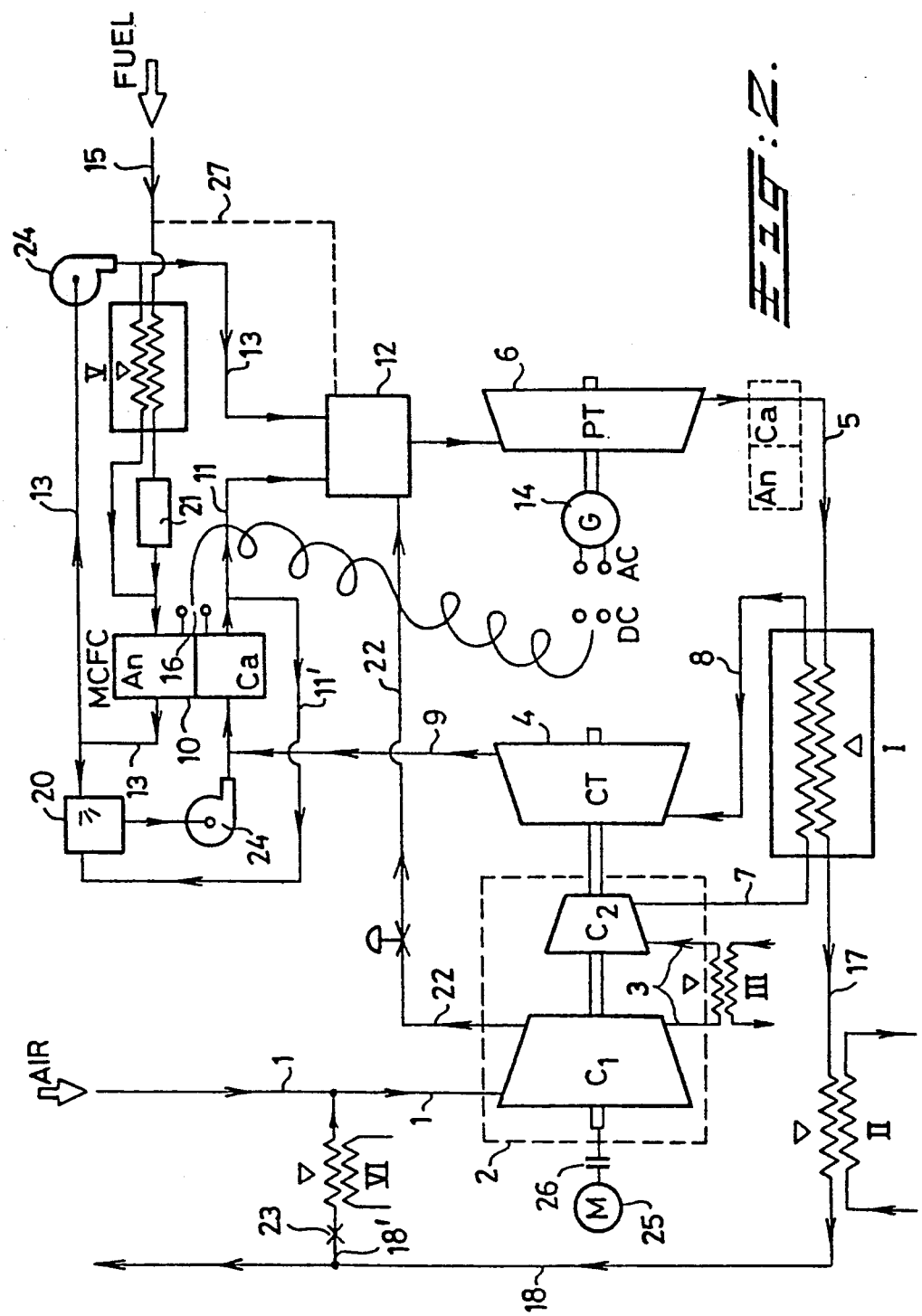

FIG. 2 shows an auxiliary burner 20 in a branch 11' of the line 11 to the gas turbine 6 for the purpose of possibly additionally heating the gaseous medium with the aid of the above-mentioned "spent fuel" originating from the line 13 from the anode of the fuel cell 10 used. Said gaseous "spent fuel" contains, for example, 15% $H_2$ and furthermore $CO_2$, $H_2O$ and $N_2$, with the result that a significant heating power is still available. In addition, said "spent fuel" is at an appreciable temperature. As a result of this, said gas can be used in the combustor 12 or in the auxiliary burner 20 (FIGS. 2–4) or may be fed back to the fuel preparation section. A purifying device 21 is generally used in the line 15. In the combustor 12 there may be an excess of $H_2$ originating from the "spent fuel" from the line 13. Additional air may therefore be supplied from the first compressor $C_1$ via a line 22 in order to achieve complete combustion. Alternatively a portion of the fuel (amongst others: spent fuel) can be used to improve the condition of the fuel entering via line 15 (for instance by steam-reforming) As a portion of $CO_2$ is directly recycled to the anode, the stream of fluid through the conduit 18' will be greatly reduced.

Figure 3:
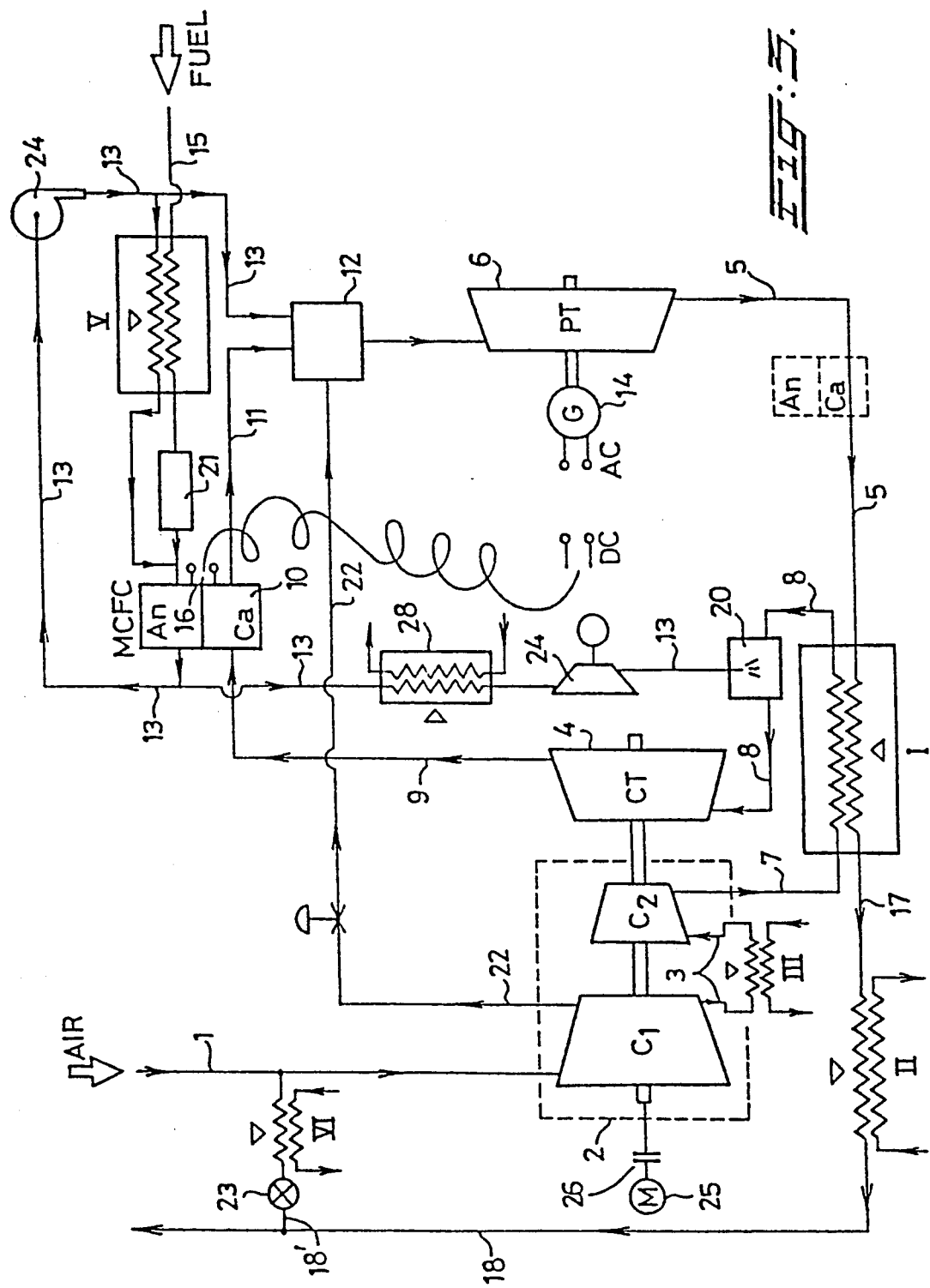

FIG. 3 shows that, to improve the system thermodynamically, the auxiliary burner 20 has been moved the the higher pressure level (for instance 885 kPa, equal to 8.85 bar) in line 8 and is used to heat the air to for instance 850° C. upstream of the turbine 4. This has the result that the temperature downstream of said turbine is for instance 620° C. as required by the MCFC fuel cell. At the same time, the pressure will decrease to for instance 290 kPa (=2.93 bar). In order to convey a portion of the "spent fuel" to the higher pressure level, a compressor 24 is indicated which is preceded by an additional cooler 28 to lower the gas from 677° C. to 30° C.

Figure 4:
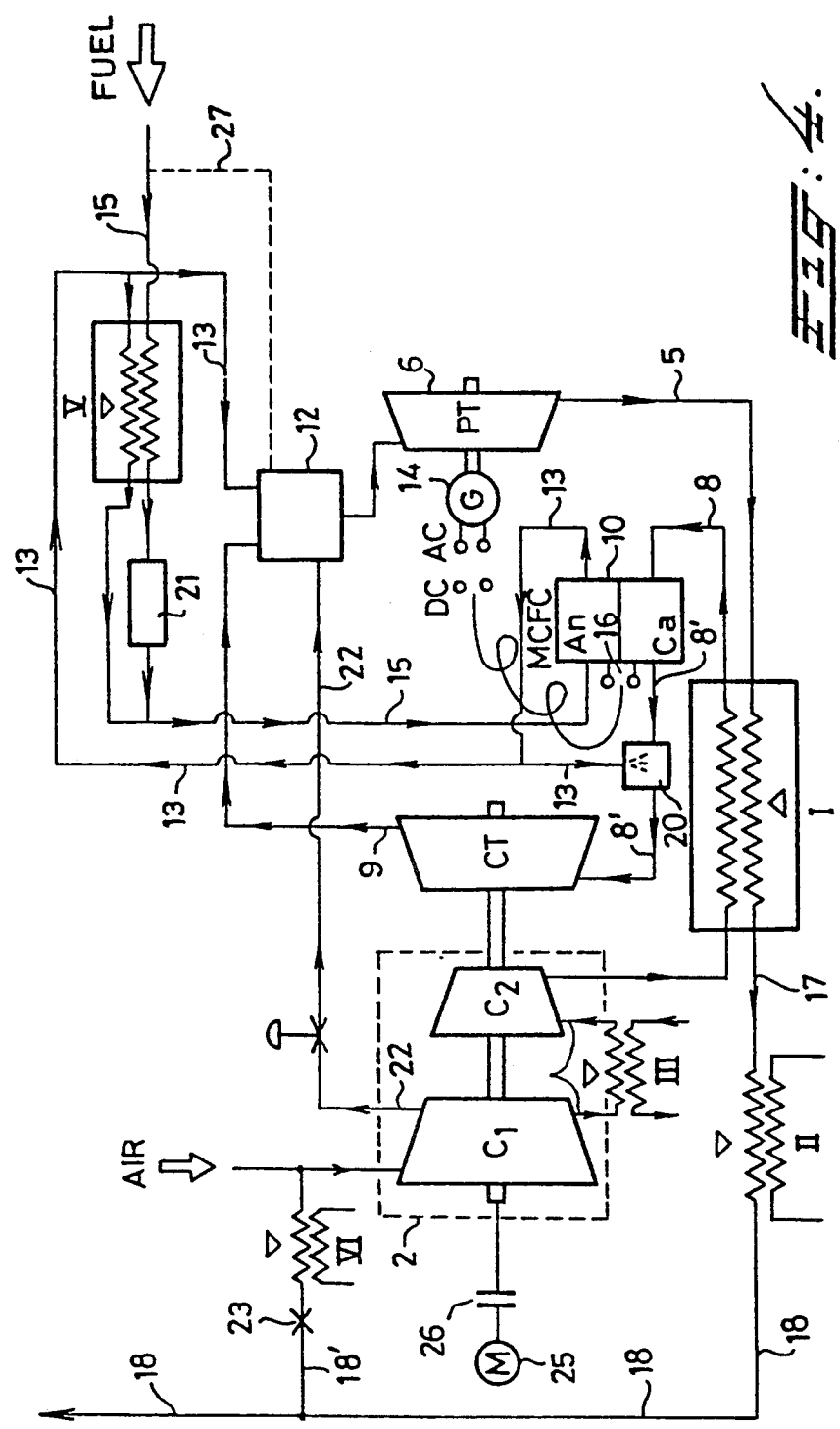

In the installation according to FIG. 4, the fuel cell 10 has been incorporated in the high-pressure section (approximately 900 kPa) of the circuit. A portion of the "spent fuel" from the anode of the fuel cell 10 is passed through the line 13 to the auxiliary burner 20 in the line 8' of the oxidizing agent stream coming out of the cathode of the fuel cell 10.

Figure 5:
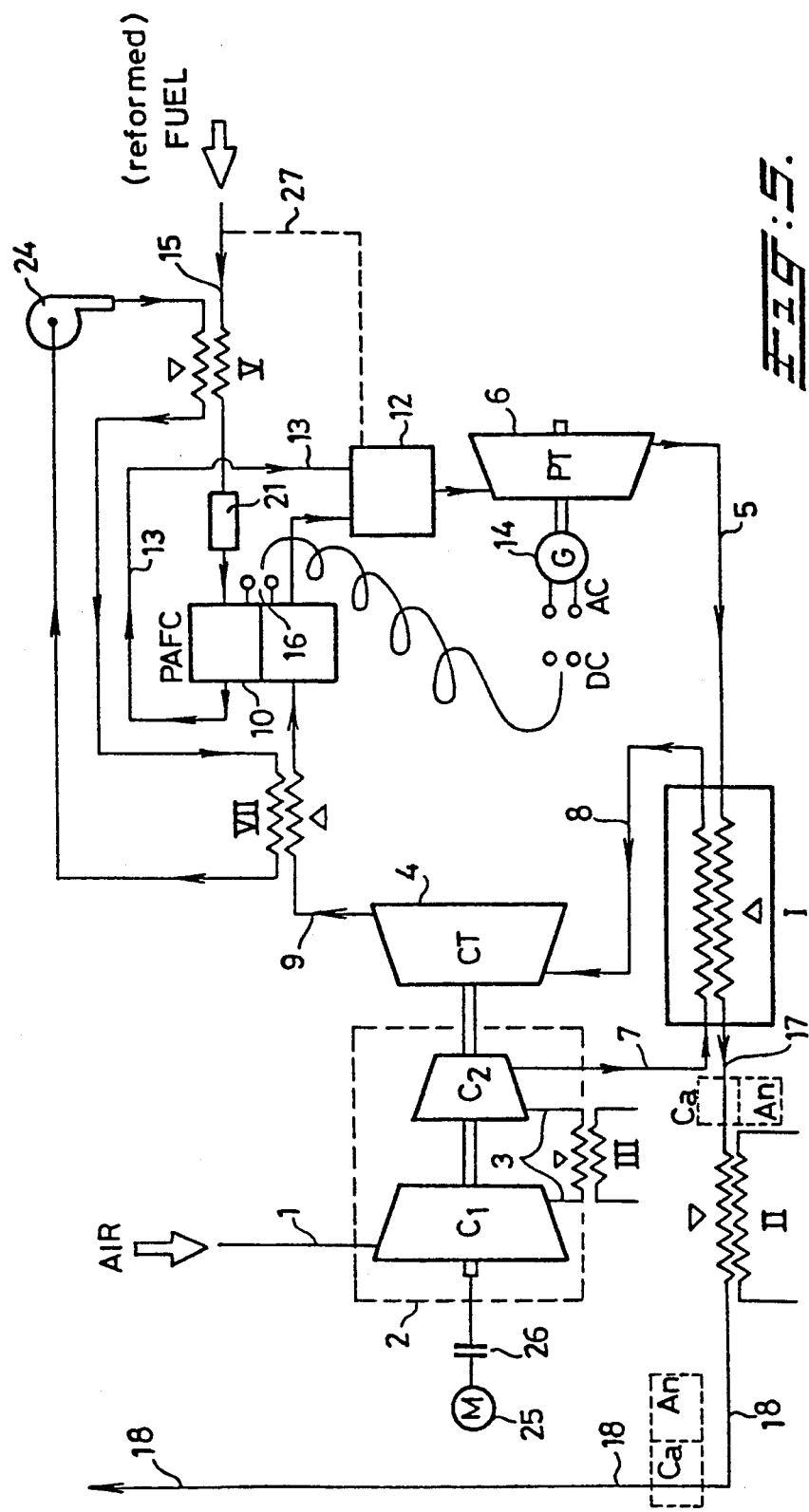
Figure 6:
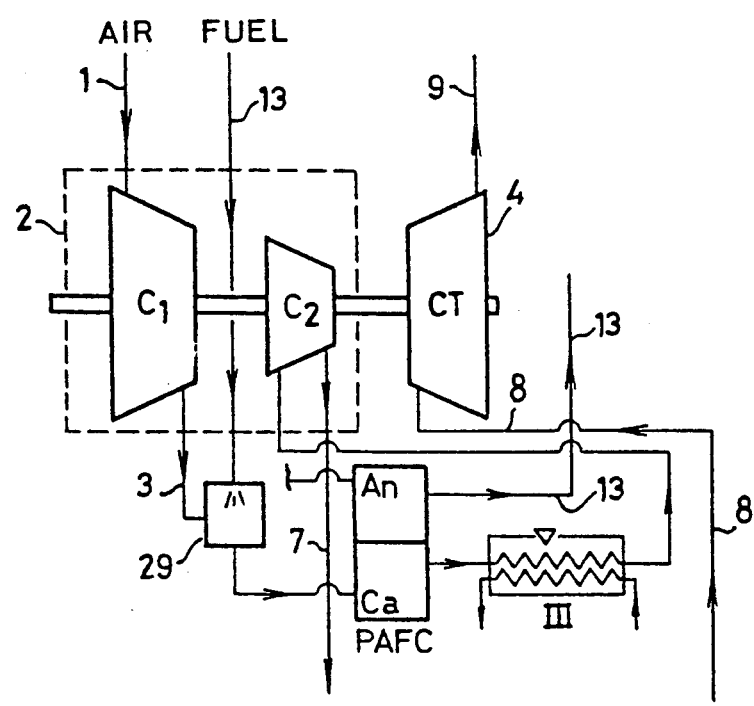

In the installation according to FIG. 5, the fuel cell 10 comprises a PAFC (a phosphoric acid fuel cell) with a working temperature of 200° C. The cell is placed in the low-pressure section of the circuit, in the line 9 from the turbine 4. The exit temperature (for instance 470° C.) of said turbine has to be lowered to 200° C. by means of a cooler VII. In practice both heat exchangers V and VII will be combined into one device. As a PAFC does not permit internal reforming, the fuel entering through the line 15 must be a hydrogen-rich gas. In FIG. 6, the fuel cell 10 has been incorporated in the circuit downstream of the low-pressure compressor $C_1$ and downstream of an additional burner 29 to raise the temperature from 137° C. to 200° C.

It is pointed out that, instead of using a fuel cell of the type MCFC or PAFC, the use of the type SOFC (solid oxide fuel cell) is also conceivable. It is further observed that low-temperature fuel cells such as alkaline fuel cells AFC and polymer fuel cells SPFC or SPEFC may be used in the relatively cool lines near the compressors and intercooler, as well as in the relatively cool exhaust line 17, 18 downstream of recuperator I. A description of all these fuel cells can be found in the above-mentioned manuals.

The circuit contains one or more centrifugal compressors 24 for the purpose of bringing about an increase in pressure for the benefit of certain sections of the circuit, or for the injection of the fuel into the burner chamber 12. Such a centrifugal compressor is not required in all of the described variants of the installation.

The installation is started with a motor 25 which is connected via a clutch 26 to the compressor unit 2. These compressors are brought to approximately 20% of the working speed. Then a burner nozzle (not depicted) is ignited by means of a spark plug (not depicted either) inside the combustor 12. The line 27 caters for the supply of fuel. The generator G is synchronized to the mains, after which the temperature of the turbine 6 is increased.

It is pointed out that the installation may also form part of a heat and power station (total-energy system) and that the gases from the line 18 can be supplied to a greenhouse to increase the $CO_2$ assimilation process.

A number of values for an imaginary installation (FIG. 1) relating to the quantity per unit time of the gas stream, the temperatures occurring and the pressures at the inlet and the outlet of the various compressors and heat exchangers and also at the turbine 4, the fuel cell 10 and the power turbine 6 have been incorporated in the table below.

TABLE

| Component | Temp. °C. | Pressure, kPa | Mass flow |
|---|---|---|---|
| medium (air) | 15 | 100 | 20,000 kg/h |
| 1st compressor | 15 | 100 | |
| | 135 | 300 | |
| Heat exchanger III | 135 | 300 | |
| | 25 | | |
| 2nd compressor | 25 | 300 | |
| | 155 | 900 | |
| Heat exchanger I | 155 | 900 | |
| | 700 | | |
| compr. turbine | 700 | 900 | powder |
| | 470 | 250 | delivered |
| Heat exchanger IV | 470–620 | 250 | ↓ |
| MCFC | 620 | | |
| | 670 | 250 | 3,750 kW |
| combustor 12 | 670–950 | 250 | |
| power turbine | 950 | 250 | |
| | 750 | 100 | 1,250 kW |
| Heat exchanger I | 750 | | |
| | 200 | 100 | TOTAL 5,000 kW |

A typical system efficiency value will be 57%

What is claimed is:

1. An installation for generating electrical energy by means of a gas stream containing a gaseous medium, comprising:
   (a) a compressor unit having an inlet side and an outlet side, the gas stream flowing therethrough, the unit increasing the pressure of the gaseous medium above the pressure at which it enters the compressor unit through the inlet side;
   (b) a flue gas heat exchanger having an inlet side and an outlet side in fluid communication with the compressor unit, the gas stream flowing therethrough, the exchanger increasing the temperature of the gaseous medium above the temperature at which it enters the flue gas heat exchanger through the inlet side of the flue gas heat exchanger;
   (c) at least one turbine having an inlet side and an outlet side in fluid communication with the compressor unit for receiving and reducing the temperature of the gaseous medium before the gaseous medium exits therefrom through the outlet side of the at least one turbine;
   (d) a fuel cell having an inlet side in fluid communication with the turbine and an outlet side in fluid communication with the compressor unit, the gas stream flowing through the fuel cell, the fuel cell increasing the temperature of the gaseous medium above the temperature at which it enters the fuel cell through the inlet side of the fuel cell;
   (e) a combustor having an inlet side and an outlet side, the inlet side being in fluid communication with the fuel cell, the gas stream flowing through the combustor; and
   (f) at least one gas turbine having an output shaft, the at least one gas turbine having an inlet side and an outlet side, the inlet side being in fluid communication with the combustor, the gas stream flowing through the at least one gas turbine for generating electromechanical energy by the action of the gaseous medium flowing therethrough; and wherein the gaseous medium in the gas stream acts as an oxidizing agent in the fuel cell for generating electrochemical energy before it exits the fuel cell through the outlet side.

2. An installation according to claim 1, in which the gas turbine is of the single-flow centripetal type.

3. An installation according to claim 1, in which the fuel cell is of the PAFC (phosphoric acid fuel cell) type.

4. The installation according to claim 1, wherein the fuel cell is disposed after the gas turbine in the installation.

5. The installation according to claim 1, wherein the compressor unit comprises a first compressor and a second compressor, and wherein the fuel cell is located between the first compressor and the second compressor in the installation.

6. The installation of claim 1, wherein the fuel cell is located subsequent to the flue gas heat exchanger in the gas stream.

7. An installation according to claim 1, wherein the fuel gas heat exchanger receives heat from a flue gas originating from the at least one turbine; the compressor unit receives the heated gas stream and drives the at least one turbine thereby;

the outlet side of the fuel cell is in fluid communication with a combustor; and the outlet side of the at least one turbine is in fluid communication with the flue gas heat exchanger.

8. An installation according to claim 1, in which the fuel cell comprises:

a MCSC (molten carbonate fuel cell).

9. An installation according to claim 8, in which the fuel cell has an anode and the anode is connected to a supply of natural gas.

10. An installation according to claim 9, in which the anode has a discharge line and an additional combustor which is connected to the discharge line of the anode of the fuel cell for receiving the natural gas.

11. The installation according to claim 1, wherein the fuel cell is disposed in the installation between the compressor unit and the at least one turbine.

12. The installation according to claim 11, wherein the fuel cell is disposed before the flue gas heat exchanger.

13. The installation of claim 1, further comprising an auxiliary burner disposed before the fuel cell in the installation.

14. The installation of claim 12, wherein the fuel cell is connected after the gas turbine in the installation.

* * * * *